US008170289B1

(12) United States Patent
Feng et al.

(10) Patent No.: US 8,170,289 B1
(45) Date of Patent: May 1, 2012

(54) HIERARCHICAL ALIGNMENT OF CHARACTER SEQUENCES REPRESENTING TEXT OF SAME SOURCE

(75) Inventors: Shaolei Feng, Amherst, MA (US);
Raghavan Manmatha, Belchertown, MA (US)

(73) Assignee: Google Inc., Mountain View, CA (US)

( * ) Notice: Subject to any disclaimer, the term of this patent is extended or adjusted under 35 U.S.C. 154(b) by 710 days.

(21) Appl. No.: 11/232,476

(22) Filed: Sep. 21, 2005

(51) Int. Cl.
*G06K 9/00* (2006.01)
(52) U.S. Cl. ........ 382/112; 382/173; 382/177; 382/181; 382/182; 382/185; 382/186; 382/226; 382/227; 382/228; 382/229; 382/309; 382/310
(58) Field of Classification Search .................. 382/177, 382/182, 226–228, 173, 112, 185, 186, 181, 382/229
See application file for complete search history.

(56) References Cited

U.S. PATENT DOCUMENTS

| | | | | |
|---|---|---|---|---|
| 5,058,179 | A * | 10/1991 | Denker et al. | 382/158 |
| 5,689,585 | A * | 11/1997 | Bloomberg et al. | 382/229 |
| 5,748,807 | A * | 5/1998 | Lopresti et al. | 382/310 |
| 5,768,603 | A * | 6/1998 | Brown et al. | 704/9 |
| 5,883,986 | A * | 3/1999 | Kopec et al. | 382/310 |
| 6,047,093 | A * | 4/2000 | Lopresti et al. | 382/310 |
| 6,178,434 | B1 * | 1/2001 | Saitoh | 715/234 |
| 6,205,444 | B1 * | 3/2001 | Floratos et al. | 707/776 |
| 6,374,210 | B1 * | 4/2002 | Chu | 704/9 |
| 6,661,919 | B2 * | 12/2003 | Nicholson et al. | 382/173 |
| 8,020,091 | B2 * | 9/2011 | Burago et al. | 715/243 |
| 2002/0067852 | A1 * | 6/2002 | Nathan et al. | 382/186 |
| 2005/0216253 | A1 * | 9/2005 | Brockett | 704/5 |
| 2010/0129882 | A1 * | 5/2010 | Dayton et al. | 435/134 |

OTHER PUBLICATIONS

Abdeddaim, S.; Fast and sound two-step algorithms for multiple alignment of nucleic sequences. Intelligence and Systems, 1996., IEEE International Joint Symposia on Nov. 4-5, 1996 pp. 4-11.*
Och, F; Ney, Hermann; A systematic comparison of various statistical alignment models. MIT Press. Computational Linguistics (Mar. 2003 vol. 29 , Issue 1, pp. 19-51.*
Kang, B.J. & Choi, K.S.; "Two approaches for the resolution of word mismatch problem caused by English words and foreign words in Korean information retrieval." Proceedings of the fifth international workshop on on Information retrieval with Asian languages , 2000, pp. 133-140.*

(Continued)

*Primary Examiner* — Brian Q Le
*Assistant Examiner* — Julian Brooks
(74) *Attorney, Agent, or Firm* — Fish & Richardson P.C.

(57) ABSTRACT

Systems and methods for character-by-character alignment of two character sequences (such as OCR output from a scanned document and an electronic version of the same document) using a Hidden Markov Model (HMM) in a hierarchical fashion are disclosed. The method may include aligning two character sequences utilizing multiple hierarchical levels. For each hierarchical level above a final hierarchical level, the aligning may include parsing character subsequences from the two character sequences, performing an alignment of the character subsequences, and designating aligned character subsequences as the anchors, the parsing and performing the alignment being between the anchors generated from an immediately previous hierarchical level if the current hierarchical level is below the first hierarchical level. For the final hierarchical level, the aligning includes performing a character-by-character alignment of characters between anchors generated from the immediately previous hierarchical level. At each hierarchical level, an HMM may be constructed and Viterbi algorithm may be employed to solve for the alignment.

27 Claims, 4 Drawing Sheets

OTHER PUBLICATIONS

H. Alshawi et al., "Learning phrase-based head transduction models for translation of spoken utterances", in Proceedings of the Fifth International Conference on Spoken Language Processing ICSLP98, 1998, Sydney.

Gutenberg Website: http://www.gutenberg.com.

T. K. Ho et al., "Evaluation of OCR accuracy using synthetic data", in Proceedings of the 4th UNLV Symposium on Document Analysis and Information Retrieval, Apr. 1995, Las Vegas, Nevada, USA.

T. Kanungo, et al., "A statistical, nonparametric methodology for document degradation model validation", IEEE Trans. on Pattern Analysis and Machine Intelligence, 2000, pp. 1209-1223, v. 22—No. 11.

S. B. Needleman, et al., "A general method applicable to the search for similarities in the amino acid sequence of two proteins", Journal of Molecular Biology, 1970, pp. 443-453, v. 48.

T. F. Smith, et al., "Identification of common molecular subsequences", Journal of Molecular Biology, 1981, pp. 195-197, v. 147.

A. J. Viterbi, "Error bounds for convolutional codes and an asymptotically optimum decoding algorithm", IEEE Transactions on Information Theory, 1967, 260-269, v. 13—no.

R. Wagner, et al., "The string-to-string correction problem", Journal of the Association for Computing Machinery, 1974, 168-173, v.21—No. 1.

V. Wu, et al., "TextFinder: an automatic system to detect and recognize text in images", IEEE Trans. on Pattern Analysis and Machine Intelligence, 1999, 1224-1229, v. 21—No. 11.

M. Kay et al., "Text-translation alignment", Computational Linguistics, Mar. 1993, pp. 121-142, vol. 19—No. 1.

A. Krogh et al., "Hidden Markov Models in Computational Biology: Applications to Protein Modeling", in Journal of Molecular Biology, 1994, vol. 235.

J. D. Hobby, "Matching Document Images with Ground Truth", "International Journal on Document Analysis and Recognition", 1997, pp. 52-61, vol. 1—No. 1.

D. Roy et al., "Speaker Identification Based Text to Audio Alignment for an Audio Retrieval System", ICASSP, 1997, pp. 1099-1102.

F. Malfrere et al., "Phonetic Alignment: Speech Synthesis Based vs. Hybrid HMM/ANN", in Proceedings of ICSLP, 1998.

P. J. Jang et al., "Learning to Recognize Speech by Watching Television", IEEE Intelligent Systems, Sep./Oct. 1999, pp. 51-58, vol. 14.

Y. Xu et al., "Prototype Extraction and Adaptive OCR", IEEE Trans. on Pattern Analysis and Machine Intelligence, Dec. 1999, pp. 1280-1296, vol. 21—No. 12.

X. Chen, Detecting and Reading Text in Natural Scenes, Proceedings of IEEE Computer Society Conference on Computer Vision and Pattern Recognition, 2004, pp. 366-373.

E. Kornfield et al., "Text Alignment with Handwritten Documents", Proceedings of Document Image Analysis for Libraries, 2004, pp. 23-24.

Y. Deng, "HMM Word and Phrase Alignment for Statistical Machine Translation", Proceedings of HLT-EMNLP, 2005.

Rothfeder, J. L., "Aligning Transcripts to Automatically Segmented Historical Documents", Submitted to the Graduate School of the University of Massachusetts Amherst in partial fulfillment of the requirements for the degree of Master of Science, May 2005.

J. Rothfeder et al., "Aligning Transcripts to Automatically Segmented Handwritten Manuscripts", in Proceedings of the Seventh International Workshop on Document Analysis Systems, 2006.

* cited by examiner

HIERARCHICAL ALIGNMENT OF CHARACTER SEQUENCES REPRESENTING TEXT OF SAME SOURCE

BACKGROUND OF THE INVENTION

1. Field of the Invention

The present invention relates generally to alignment of two text sequences, e.g., of a optical character recognition (OCR) output with an electronic version of the same document. More specifically, systems and methods for character-by-character alignment of two character sequences (such as OCR output from a scanned document and an electronic version of the same document) using a Hidden Markov Model (HMM) in a hierarchical fashion are disclosed.

2. Description of Related Art

Scanning books, magazines, and other printed material into digital form has become more common with the advent of improved imaging, storage and distribution techniques. Many institutions, such as the libraries, universities, bookstores, and private enterprises have vast collections of documents. By converting these documents into electronic form, such institutions can reduce the cost of storage, facilitate remote access, enable simultaneous access by multiple users, facilitate search and retrieval of information, and/or protect information in rare or out-of-print works from loss or destruction.

Once the content of a document is scanned, the digitally recorded image can be manipulated or otherwise processed. For example, preprocessing algorithms may be performed to de-warp, reformat, supplement with additional information, and/or compress the digitally recorded image. After performing the preprocessing algorithms, the preprocessed image may be processed with optical character recognition (OCR) software and may be indexed to facilitate electronic search. Thus, scanning and recording of documents facilitates the creation of digital libraries that can be remotely and simultaneously accessed and searched by multiple users.

Various factors may affect the accuracy of the OCR output. For example, each preprocessing algorithm performed on the digitally recorded images as well as the particular OCR software engine utilized may affect the accuracy of the OCR output. In addition, the imaging conditions and/or the original (hardcopy) document itself may also affect the accuracy of the OCR output, depending on, for example, the contents of the document (e.g., language, font, font size, page size, margins, text format such as columns, embedded images, etc.), the imaging conditions (e.g., operator, positioning of the document, camera zoom, camera focus, camera angle, and the like), etc. Thus, it would be desirable to provide systems and methods to facilitate evaluation of OCR software engines and/or facilitate evaluation of the effects of preprocessing algorithms performed on the scanned document on the accuracy of the OCR output.

SUMMARY OF THE INVENTION

Systems and methods for character-by-character alignment of two character sequences (such as OCR output from a scanned document and an electronic version of the same document) using a Hidden Markov Model (HMM) in a hierarchical fashion are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

Hierarchical alignment as described herein may advantageously and successfully generate an alignment even where the two character sequences are long and/or when the one or both of the characters sequences include many errors. As an example, the two character sequences may be an OCR output from a scanned document such as a book and an electronic text version (groundtruth) corresponding to the book. A typical book may have, e.g., more than 1 million characters, and/or there may be many errors in one or both of the character sequences. Hierarchical alignment can achieve alignment even when large portions of text are missing from one or both of the characters sequences. Such a scenario may occur, for example, where the two character sequences, although representing text from the same source, may be generated from or based on different editions of the same source such that one edition of the source may have a preface, introduction, and/or chapter missing as compared to the other edition of the same source. Such a scenario may also occur, for example, where one of the character sequences is generated by scanning the source and one or several consecutive pages are missing and/or duplicated due to errors in the scanning process. As noted, hierarchical alignment can also achieve alignment even when one or both of the characters sequences include many errors, such as a result of OCR errors.

The method for character-by-character alignment may generally include aligning two character sequences utilizing multiple hierarchical levels. For each hierarchical level above a final hierarchical level, the aligning may include parsing character subsequences from the two character sequences, performing an alignment of the character subsequences, and designating aligned character subsequences as the anchors, the parsing and performing the alignment being between the anchors if the current hierarchical level is below the first hierarchical level. For the final hierarchical level, the aligning may include performing a character-by-character alignment of characters between anchors. At each hierarchical level, an HMM may be constructed and the Viterbi algorithm may be employed to solve for the alignment. The hierarchical levels may, for example, include three hierarchical levels in which the character subsequences corresponding to the second hierarchical level are words such that in the second hierarchical level, the alignment is performed on words in the character sequences between the anchors obtained from the first hierarchical level.

The two character sequences may be the output of an optical character recognition (OCR) engine on a scanned printed version of a document and an electronic text version (groundtruth) for the same document. The document may be, for example, a book, an article, a magazine, or the like.

In one embodiment, the character subsequences corresponding to the first hierarchical level may be sentences. In the first hierarchical level, the alignment may be performed on sentences in the first sequence and corresponding matching sentences in the second sequence. In the second hierarchical level, the alignment may be performed on words.

In another embodiment, the character subsequences corresponding to the first hierarchical level may be unique words where the parsing may include locating words that occur only once in the first character sequence (e.g., groundtruth) as unique words and locating words in the second character sequence (e.g., OCR output) that correspond to the unique words. Note that words (if any) in the second character sequence corresponding to each unique word may not exist, may be unique, or may not be unique. In the first hierarchical level, the unique words in the first character sequence are aligned with words in the second character sequence corresponding to the unique words. Using unique words for the first hierarchical level in the hierarchical alignment, the hierarchical alignment may successfully generate an alignment even when there are no aligned, e.g., exactly matching, sentences in as many as, e.g., 80 pages.

A system for generating a character-by-character alignment between a first and a second character sequence representing text in a document may generally include a text alignment engine configured to align the two character sequences in a hierarchical manner utilizing a plurality of hierarchical levels. For each hierarchical level above a final hierarchical level, the text alignment engine may be configured to parse character subsequences from the two character sequences at a current hierarchical level, perform an alignment of the parsed character subsequences, and designate aligned character subsequences at the current hierarchical level as anchors, the parse and the alignment being between the anchors if the current hierarchical level is below the first hierarchical level. For the final hierarchical level, the text alignment engine may be configured to perform a character-by-character alignment for characters between anchors. The system may further include a document scanner and/or an OCR engine.

The system for generating a character-by-character alignment between a first and a second character sequence representing text in a document may be implemented as a computer program product for use in conjunction with a computer system, the computer program product comprising a computer readable storage medium on which are stored instructions executable on a computer processor. The instructions may generally include aligning the two character sequences in a hierarchical manner utilizing a plurality of hierarchical levels. For each hierarchical level above a final hierarchical level, the instructions for aligning may include parsing character subsequences from the two character sequences at a current hierarchical level, performing an alignment of the parsed character subsequences, and designating aligned character subsequences at the current hierarchical level as anchors, the parsing and the alignment being between the anchors if the current hierarchical level is below the first hierarchical level. For the final hierarchical level, the instructions for aligning may include performing a character-by-character alignment for characters between the anchors.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods for character-by-character alignment of two character sequences (such as OCR output from a scanned document and an electronic version of the same document) using a Hidden Markov Model (HMM) in a hierarchical fashion are disclosed. The alignment may be used to, for example, facilitate evaluation of OCR engines and/or facilitate evaluation of the effects of preprocessing algorithms performed on the scanned document on the accuracy of the OCR output. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
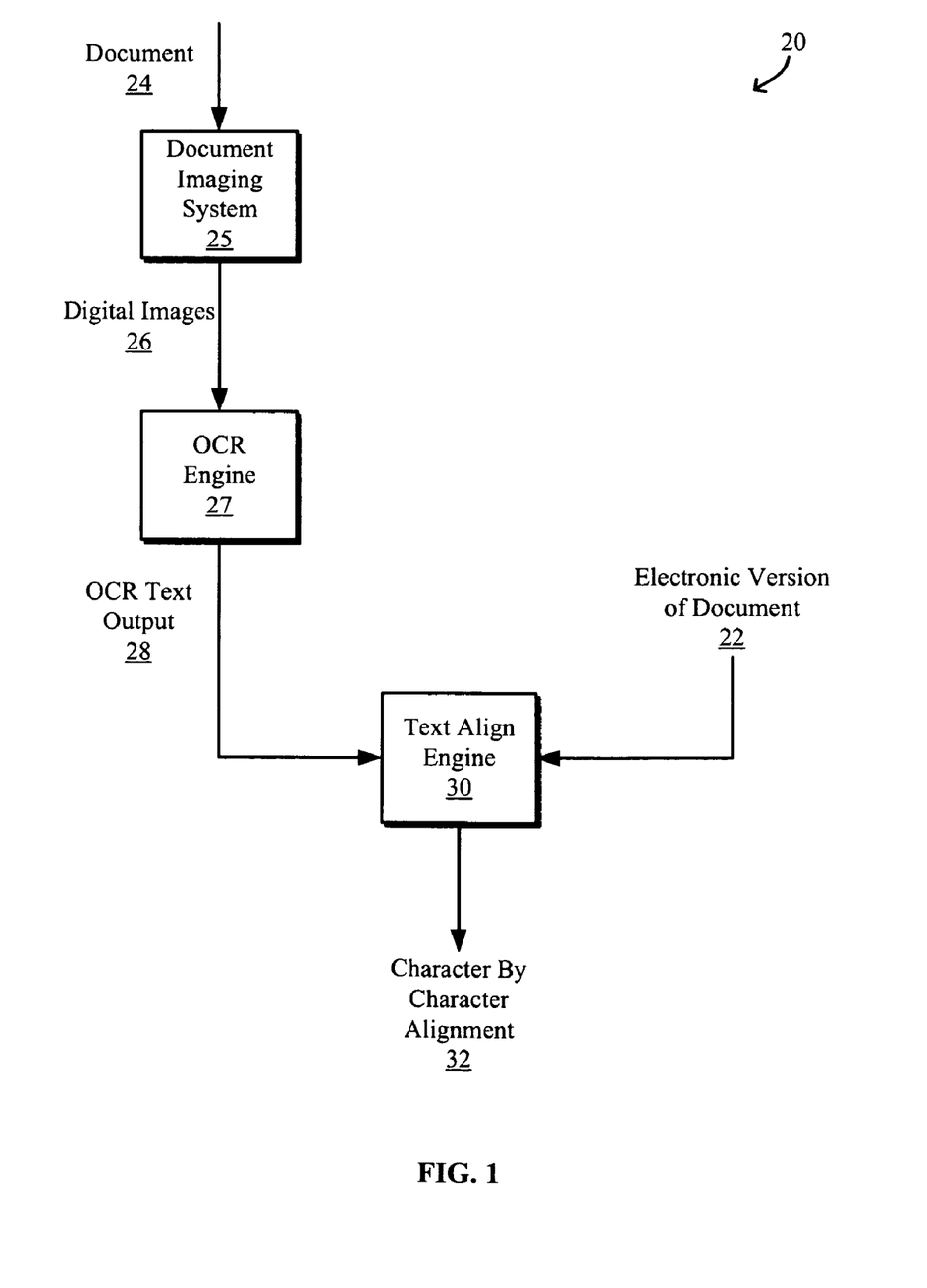
FIG. 1 is a block diagram illustrating an exemplary system for generating a character-by-character alignment between OCR output of a scanned document and an electronic version of the document.

FIG. 1 is a block diagram illustrating an exemplary system 20 for generating a character-by-character alignment 32 between the OCR output 28 of a scanned document 26 and an electronic version 22 of the document 24. Examples of documents 24 include books, articles, magazines, and other printed material. The electronic version 22 of the document 24 is also referred to herein as the groundtruth. Generally, there are errors in both the OCR text output 28 and the electronic version 22 of the document 24. Examples of errors in the electronic version 22 of the document 24 include missing pages or sections. In addition, although the electronic version 22 is typically of the exact same document 24, the electronic version may be of a different version or edition of the same document 22.

The document 24 may first be scanned (e.g., imaged) using a document scanning systems 25 to generate one or more digital images 26 of the document 24 on which OCR may be performed by an OCR engine 27 to generate OCR text output 28. Any suitable combination of various document scanning systems 25 and OCR engines 27 (e.g., any commercially available OCR engine) may be employed. The OCR text output 28 and the electronic version of the document 22 may then be used as input to a text alignment engine 30. The text alignment engine 30 may model the alignment utilizing a Hidden Markov Model (HMM) in a hierarchical fashion in that each hierarchical level corresponds to a different subsequences of the document text and the aligned subsequences in a given hierarchical level are used as anchors in a subsequent lower hierarchical level until character by character alignment is completed. The modeling using HMMs in a hierarchical fashion will be discussed in more detail below.

The text alignment engine 30 may employ various hierarchical structures in performing character-by-character alignment. For example, in one embodiment, character by character alignment can be achieved in a hierarchical fashion by first aligning sentences in the groundtruth and the OCR text output. At this sentence hierarchical level, only the sentences are aligned using an HMM. This sentence level alignment produces sentence anchors where sentence align. These sentence anchors can then be used to divide the text sequence into smaller subsequences, i.e., the text between the sentence anchors. Thus in the next hierarchical level, an HMM is used to align words between two sentence anchors. Finally, in the third hierarchical level, the characters between any two aligned words can then be aligned using an HMM.

As another example, character by character alignment can be achieved in a hierarchical fashion by first aligning unique words in the groundtruth with words in the OCR text output that correspond to the unique words in the groundtruth. At this unique word hierarchical level, only the unique words are aligned using an HMM. This unique word level alignment produces unique word anchors where the unique words align. These unique word anchors can then be used to divide the text sequence into smaller subsequences, i.e., the text between the unique word anchors. Thus in the next hierarchical level, an HMM is used to align the remaining (non-unique) words between two unique word anchors to generate non-unique word anchors. Finally, in the third hierarchical level, the characters between two aligned non-unique word can then be aligned using an HMM.

Figure 2:
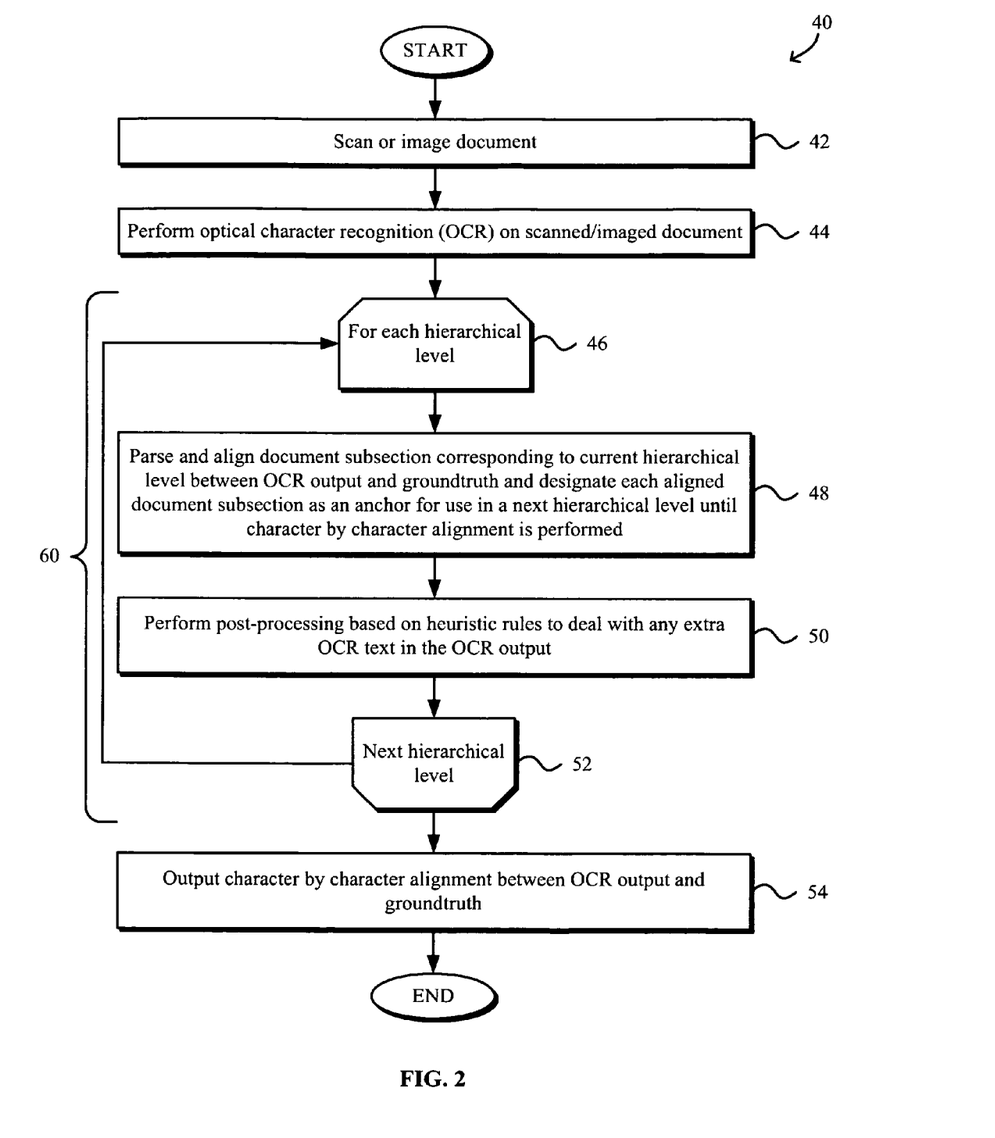
FIG. 2 is a flowchart illustrating an exemplary process for generating the character-by-character alignment in a hierarchical fashion between the OCR output of the scanned document and the electronic version of the document.

FIG. 2 is a flowchart illustrating an exemplary process 40 for generating the character-by-character alignment in a hierarchical fashion between the OCR output of the scanned document and the electronic version of the document. Specifically, at block 42, the document is scanned or otherwise imaged to generate digital images. At block 44, OCR is performed on the digital images. A character-by-character alignment between the OCR output and the groundtruth is performed, as designated by reference numeral 60. The process 40 then outputs the character-by-character alignment at block 54. In the character-by-character alignment output, any extra OCR text (e.g., text included in the OCR text but not included in the groundtruth) is eliminated. Examples of extra OCR text include pages that are scanned multiple times, preface (which is often not included in the groundtruth text), and the like.

The character-by-character alignment process 60 may be implemented as an iterative process in which alignment is modeled using a Hidden Markov Model (HMM) in a hierarchical fashion. Generally, HMMs are an effective way of aligning sequences. The HMM is constructed with a state for each position (corresponding to the unit, e.g., sentence, word, character, etc. being aligned) in the OCR text output. The state space is the set of all positions of unit strings (corresponding to the unit or subsequence being aligned) in the groundtruth sequence. Each state is assumed to generate one of the OCR unit strings.

In the HMM, probabilities or costs are associated with each state. At each state, there is a probability for generating the observation (observation or generative probabilities) and a probability associated with each transition between states (transition probabilities). The transition probability can be computed using an exponential decay function. The observation probability can be estimated by examining the difference between the OCR unit string corresponding to the current state and the unit string being generated. Where the alignment criterion is an exact match, a state with an exact match can be given a very high probability and a state without an exact match can be given a very low probability. Where the alignment criterion is other than an exact match, e.g., where the unit strings are sentences and the alignment criterion is edit distance, the probability can be estimated as a function of the alignment criterion (e.g., edit distance) between the two unit strings (e.g., sentences) being aligned. The transition probability is generally a function of how many groundtruth positions are skipped and can be estimated using an exponential backoff algorithm. The alignment can be generated by finding the most probable (least cost) sequence in the HMM, e.g., using the Viterbi algorithm. In other words, the alignment of the sequence is simply the highest-probability, or lowest-cost, path through the HMM. The Viterbi algorithm may be employed to solve for the alignment at each hierarchical level.

As noted, the HMM is employed in a hierarchical fashion in that each hierarchical level corresponds to a different document subsequence and the aligned document subsequences in a given hierarchical level are used as anchors in a subsequent lower hierarchical level until character by character alignment is completed. The hierarchical structure may be employed for purposes of speed and/or accuracy. Specifically, because a document such as a book may be very long, i.e., a very long text sequence of characters, character by character alignment can be achieved more efficiently and effectively in a hierarchical fashion. Aligning every word or character in a book (i.e., in a non-hierarchical fashion) would likely create a very long state sequence resulting in a very slow alignment process. In addition, the alignment could be erroneous as it would be much more difficult to recover from errors. For example, the hierarchical structure allows alignment even in situations where there are a large number of consecutive pages missing and/or there are large number of errors in the OCR text output.

In a hierarchical alignment, for each hierarchical level 46, document subsequences are parsed and aligned between the OCR text output and the groundtruth at block at block 48. In addition, each aligned document subsequence may be designated as an anchor for use in the next hierarchical level 52 until character by character alignment is completed.

For each hierarchical level, post-processing based on heuristic rules can also be performed at block 50 to deal with any extra OCR text in the OCR output after the HMM-based alignment. Extra text in the OCR output may result from, for example, omitted texts in the groundtruth and/or other reasons. When there is extra OCR text in the OCR output, the HMM tends to align all the extra unit strings in a continuous section of OCR output to one unit string in the groundtruth. Heuristic rules may be used to decide which unit string in a given continuous section of OCR output is the real correspondence of that aligned unit string in the groundtruth and decide that other unit strings in the continuous section of the OCR output is extra OCR text.

For example, the heuristic rules may require that, if there are unit strings in a given section of OCR output that exactly match the assigned unit string in the groundtruth, the first exactly matched string in the section of OCR output be selected and designate the other unit strings in the section of the OCR output as extra OCR text. However, if there are no unit strings in this section of OCR output that exactly match the assigned unit string in the groundtruth, the heuristic rules may require that the similarities of each unit string in this section of OCR output to the assigned unit string in the groundtruth as well as the neighbors of the assigned unit string in the groundtruth may be calculated. The heuristic rules may further require that if the similarities are lower than some predetermined threshold, this unit string in the OCR output is designated as extra OCR text.

Figure 3:
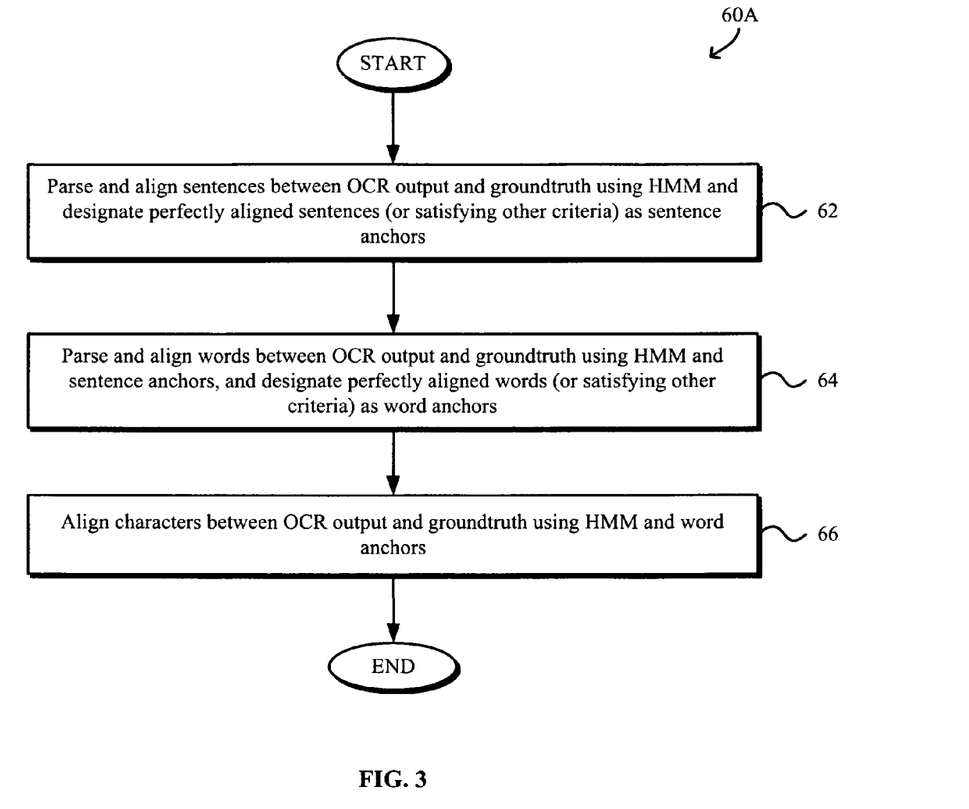
FIG. 3 is a flowchart illustrating an example of a character-by-character alignment process that employs three hierarchical levels in which the subsequences of the document text corresponding to the three hierarchical levels include sentences, words, and characters.

As noted, the character-by-character alignment process 60 may employ various hierarchical structures. For example, as shown in the flowchart of FIG. 3, a character-by-character alignment process 60a may employ three hierarchical levels in which the document subsequences corresponding to the three hierarchical levels include sentences, words, and characters. Specifically, at block 62, sentences are parsed and aligned between the OCR output and groundtruth using a sentence level HMM. Also at block 62, perfectly aligned sentences (or sentences satisfying other sentence alignment criteria) are designated as sentence anchors for the next (lower) hierarchical level. As is known, sentences may be parsed using, for example, periods, exclamation points, and question marks. Typically, only sentences that are aligned with relatively high accuracy are designated as sentence anchors. For example, edit distance may be used as a criterion for determining the accuracy of the alignment at the sentence level. For the sentence level HMM, each position in the HMM is assumed to correspond to a sentence in the OCR output. In addition, the generative probabilities in the sentence level HMM can be estimated by examining the similarity between the sentences in the OCR text output and the groundtruth while the transitional probabilities can be estimated using a backoff algorithm. As noted above, a Viterbi algorithm may be employed to solve for the most likely sentence alignment.

Next, at block 64, words are parsed and aligned between the OCR output and groundtruth using an HMM and using the sentence anchors. In other words, the output of the sentence level alignment, e.g., the sentence anchors, can be used to constrain the word level alignment such that a word level HMM model is used to align only words between the sentence anchors, e.g., word level alignment is performed only for words between the sentence anchors. In particular, the sentence anchors facilitates in breaking up the character sequences into subsequences that can then be separated and thus efficiently aligned at the next hierarchical (e.g., word) level. Also at block 64, perfectly aligned words (or words satisfying other word alignment criteria) are designated as word anchors for the next (lower) hierarchical level.

The word level HMM is similar to the sentence level HMM. For example, each position in the word level HMM is assumed to correspond to a word in the OCR output and the word level alignment is only done for words in the OCR output that are between the sentence anchors. In addition, the generative probabilities in the word level HMM can be estimated by examining the similarity between the words in the OCR text output and the groundtruth while the transitional probabilities can be estimated using a backoff algorithm. A Viterbi algorithm may be employed to solve for the most likely word alignment.

Lastly, at block 66, characters are aligned between the OCR output and groundtruth using an HMM and using the word anchors. The process for character level alignment is similar to that for word alignment. For example, the output of the word level alignment, e.g., the word anchors, can be used to constrain the character level alignment such that a character level HMM model is used to align only characters between the word anchors, e.g., character level alignment is performed only for characters between the word anchors. In addition, each position in the character level HMM is assumed to correspond to a character in the OCR output. In addition, the generative probabilities in the character level HMM can be estimated by examining the similarity between the characters in the OCR text output and the groundtruth while the transitional probabilities can be estimated using backoff algorithm. A Viterbi algorithm may be employed to solve for the most likely character alignment.

As is evident, constructing the HMM for character-by-character alignment in a hierarchical fashion, e.g., by constraining the HMM construction at each subsequent hierarchical level using anchors or points determined in a previous (higher) hierarchical level, can help increase computational speed and thus reduce time and cost. In particular, the anchors generated at each hierarchical level (except the final hierarchical level) break up the character sequences into subsequences that can then be separately and efficiently aligned. In addition, such hierarchical HMM construction may also facilitate achieving higher accuracy, e.g., by allowing character-by-character alignment even in situations where there are a large number of consecutive pages missing and/or there are a relatively large number of errors in the OCR text output.

As noted, the character-by-character alignment process 60 may employ various suitable hierarchical structures. As another example, character by character alignment can be achieved in a hierarchical fashion by first locating unique words, i.e., words that occur only once, in the groundtruth, as well as words in the OCR text output corresponding to those unique words. The words in the OCR text output corresponding to the unique words in the groundtruth may or may not be unique due to, for example, errors and/or other differences between the two versions of the documents. Only the unique words in the groundtruth and their correspondences in the OCR text output are aligned using an HMM. This unique word level alignment produces unique word anchors where the unique words align. These unique word anchors can then be used to divide the text sequence into smaller subsequences, i.e., the text between the unique word anchors. Thus in the next hierarchical level, an HMM is used to align words between two unique word anchors. Finally, all the characters between any two aligned words (unique or otherwise) can then be aligned using an HMM. This example of hierarchical alignment is described in more detail below with reference to FIG. 4.

Figure 4:
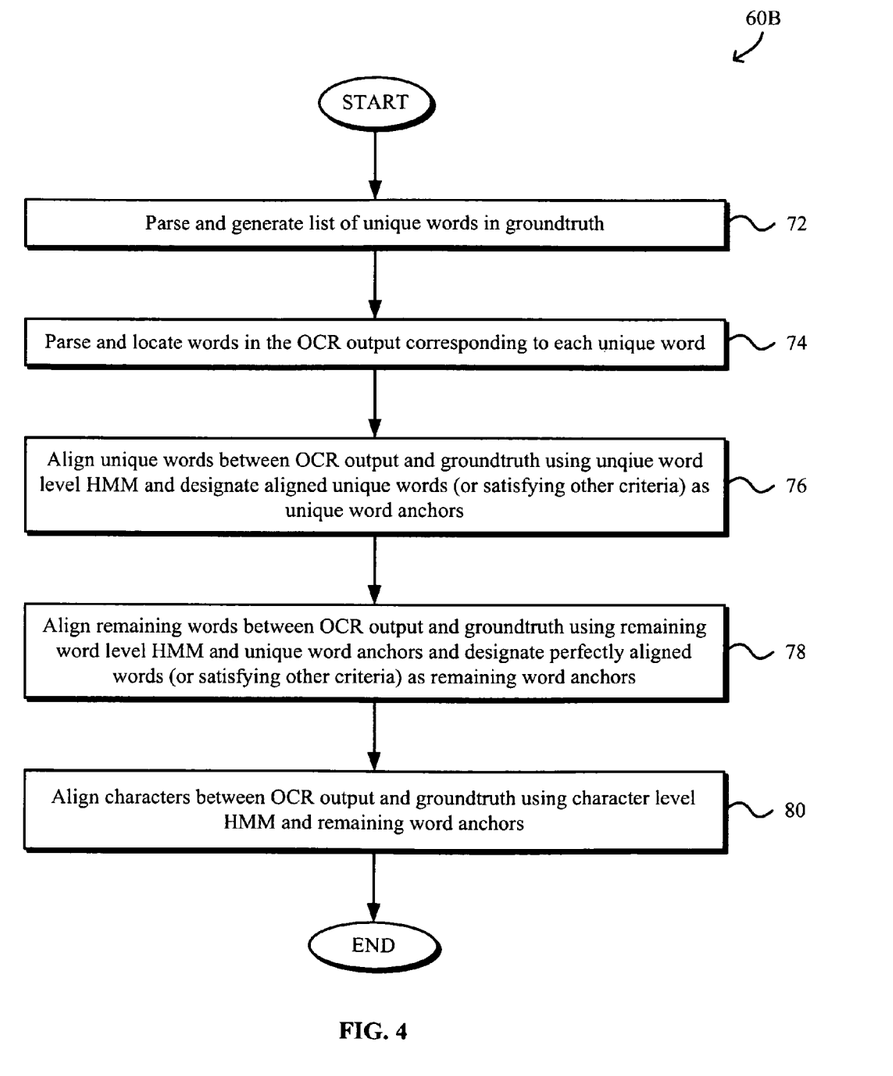
FIG. 4 is a flowchart illustrating another example of a character-by-character alignment process that employs three hierarchical levels in which the subsequences of the document text corresponding to the three hierarchical levels include unique words, words between unique word anchors, and characters.

Specifically, FIG. 4 is a flowchart illustrating another example of a character-by-character alignment process 60b that employs three hierarchical levels in which the document subsequences corresponding to the three hierarchical levels include unique words, words between unique word anchors, and characters. In other words, rather than using sentences for the top level alignment, the top level alignment utilizes unique words.

At block 72, a list of unique words in the groundtruth is generated. According to Zipf's law, there would typically be a large number of unique words for each document. At block 74, each unique word in the list is located in the OCR text output. Note that for each unique word in the list generated from the groundtruth, 0, 1 or multiple matches may be located in the OCR text output due to scanning errors (e.g., a missing page(s) and/or page(s) scanned multiple times), OCR output errors, a different edition of the document, a portion of the document (e.g., the preface) not included in the groundtruth, etc.

At block 76, unique words are aligned between the OCR output and groundtruth using a unique word level HMM. The unique word level HMM uses the unique words in the groundtruth and their correspondences in the OCR text output. Also at block 76, perfectly aligned unique words (or unique words satisfying other unique word alignment criteria) are designated as unique word anchors for the next (lower) hierarchical level. Typically, only unique words that are exactly matching are designated as unique word anchors. In one embodiment, only unique words in the groundtruth and their correspondences in the OCR text output are used for the alignment. As an alternative, rather than merely matching the unique words and their correspondences, multiple-word sequences may be used for alignment at the unique word hierarchical level. Each multiple-word sequence may include the unique word (or its correspondence) as well as adjacent words (e.g., one or two words to each side of the unique word or its correspondence). For the unique word level HMM, each position in the HMM is assumed to correspond to a unique word in the OCR output. In addition, the generative probabilities in the unique word level HMM can be estimated by examining the similarity between the unique words in the OCR text output and the groundtruth while the transitional probabilities can be estimated using a backoff algorithm. As noted above, a Viterbi algorithm may be employed to solve for the most likely unique word alignment.

The unique word level alignment provides unique word anchors or points to constrain or guide the alignment at the next hierarchical, e.g., the non-unique word level alignment at block 78. In particular, the unique word anchors break up the character sequences into subsequences that can then be separated and thus efficiently aligned. The non-unique word level alignment at block 78 is similar to the word level alignment of block 64 as described above with reference to FIG. 3. Specifically, at block 78, the remaining (e.g., non-unique) words are aligned between the OCR output and the groundtruth using a remaining word level HMM and the unique word anchors. Also at block 78, perfectly aligned words (or satisfying other criteria) may be designated as remaining word anchors for use in alignment in the next (lower) hierarchical level.

Lastly, at block 80, characters are aligned between the OCR output and groundtruth using a character level HMM and using the non-unique word anchors. The character-level alignment at block 80 is similar to the character alignment of block 66 as described above with reference to FIG. 3. In particular, at block 80, the output of the non-unique word level alignment, e.g., the non-unique word anchors, can be used to constrain the character level alignment such that a character level HMM model is used to align only characters between the non-unique word anchors, e.g., character level alignment is performed only for characters between the non-unique word anchors. In addition, each position in the character level HMM is assumed to correspond to a character in the OCR output. Furthermore, the generative probabilities in the character level HMM can be estimated by examining the similarity between the characters in the OCR text output and the groundtruth while the transitional probabilities can be estimated using backoff algorithm. A Viterbi algorithm may be employed to solve for the most likely character alignment.

The automatic alignment of OCR output, e.g., from a scanned document, with the groundtruth using an HMM in a hierarchical fashion can be utilized to evaluate various factors that affect the error rate of the OCR output. Examples of such factors include, for example, effect of any preprocessing algorithms performed on the scanned (e.g., digitally recorded) images, the particular OCR software engine utilized, factors relating to the original document itself and/or the imaging conditions. In particular, factors that relate to the original document itself may include, for example, the language, font, font size, page size, margins, text format such as columns, embedded images, etc. Factors that relate to the imaging conditions may include, for example, the operator, positioning of the document, camera zoom, camera focus, camera angle, and the like. The automatic alignment systems and methods described herein may also be utilized to calibrate other techniques for estimating OCR error rates on the fly, for example. Further, the systems and methods described herein can also be utilized to generate training data to help improve existing OCR software.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for generating a character-by-character alignment between a first and a second character sequence, comprising:
executing on a processor instructions for aligning the two character sequences in a hierarchical manner utilizing a plurality of hierarchical levels, wherein the first character sequence is an optical character recognition (OCR) text output of a document, and the second character sequence is a separate electronic version of the document, and wherein:
for a first hierarchical level, unique words of the second character sequence are aligned with corresponding words of the first character sequence and unique word anchors for a lower hierarchical level are designated;
for each hierarchical level below the first hierarchical level and above a final hierarchical level, aligning the two character sequences includes:
parsing the two character sequences at a current hierarchical level into character subsequences,
aligning the character subsequences, and
designating the character subsequences at the current hierarchical level as anchors, the parsing of the character sequences and aligning of the character subsequences being performed between the anchors generated from an immediately previous hierarchical level if the current hierarchical level is below the first hierarchical level; and
for the final hierarchical level, aligning the two character sequences includes:
performing character-by-character alignment between the first character sequence and the second character sequence by aligning each character in the first character sequence at the final hierarchical level to each respective character in the second character sequence at the final hierarchical level, each of the characters being between anchors generated from an immediately previous hierarchical level,
identifying extra OCR text, the extra OCR text comprising text that is included in the first character sequence and that is not included in the second character sequence, and
eliminating the extra OCR text from the OCR text output.

2. The method of claim 1, wherein the hierarchical levels include the first, a second, and the final hierarchical level, and the character sequences corresponding to the second hierarchical level are words.

3. The method of claim 2, wherein in the second hierarchical level, the alignment of the two character sequences is performed between words in the two character sequences corresponding to the first hierarchical level, the words being only between the unique word anchors designated from the first hierarchical level.

4. The method of claim 2, wherein character subsequences corresponding to the first hierarchical level are the unique words and two character sequences at the first hierarchical level are parsed by locating and designating words that occur only once in the second character sequence as unique words and locating words in the first character sequence that correspond to the unique words.

5. The method of claim 1, wherein aligning the two character sequences further includes constructing a Hidden Markov Model (HMM) at the current hierarchical level.

6. The method of claim 1, wherein the alignment of the two character sequences is performed utilizing a Viterbi algorithm to solve for the alignment at the current hierarchical level.

7. The method of claim 1, further comprising:
scanning the document to generate a digital image of the document; and
performing optical character recognition (OCR) on the digital image of the document to generate the OCR text output.

8. The method of claim 1, wherein the document is selected from the group consisting of a book, an article, and a magazine.

9. The method of claim 1, wherein at each hierarchical level, aligning the two character sequences results in at least one continuous multiple character subsequence in the first character sequence to be aligned with one character subsequence in the second character sequence, the continuous multiple character subsequences including an actual corresponding character subsequence and one or more extra character subsequences, and wherein aligning the two character sequences further includes, performing post-processing based on heuristic rules to separate the actual corresponding character subsequence from the one or more extra character subsequences.

10. The method of claim 1, further comprising performing post-processing based on heuristic rules to separate an actual corresponding character subsequence from one or more extra character subsequences, the one or more extra character subsequences being present in only one of the first and second character sequences.

11. A computer program product tangibly embodied in a non-transitory computer-readable storage medium for generating a character-by-character alignment between a first and a second character sequence, the computer program product being operable to cause a computer processor to:
align the two character sequences in a hierarchical manner utilizing a plurality of hierarchical levels, wherein the first character sequence is an optical character recognition (OCR) text output of a document, and the second character sequence is a separate electronic version of the document, and wherein:
for a first hierarchical level, unique words of the second character sequence are aligned with corresponding words of the first character sequence and unique word anchors for a lower hierarchical level are designated;
for each hierarchical level below the first hierarchical level and above a final hierarchical level, instructions for aligning the two character sequences include:
parsing the two character sequences at a current hierarchical level into character subsequences,
aligning the character subsequences, and
designating the character subsequences at the current hierarchical level as anchors, the parsing of the character sequences and aligning of the character subsequences being performed between the anchors generated from an immediately previous hierarchical level if the current hierarchical level is below the first hierarchical level; and
for the final hierarchical level, the instructions for aligning include:
performing character-by-character alignment between the first character sequence and the second character sequence by aligning each character in the first character sequence at the final hierarchical level to each respective character in the second character sequence at the final hierarchical level, each of the characters being between anchors generated from an immediately previous hierarchical level, and
identifying extra OCR text, the extra OCR text comprising text that is included in the first character sequence and that is not included in the second character sequence, and
eliminating the extra OCR text from the OCR text output.

12. The computer program product of claim 11, wherein the hierarchical levels include the first, a second, and the final hierarchical level, and the character sequences corresponding to the second hierarchical level are words.

13. The computer program product of claim 12, wherein in the second hierarchical level, the alignment of the two character sequences is performed between words in the two character sequences corresponding to the first hierarchical level, the words being only between the unique word anchors designated in the first hierarchical level.

14. The computer program product of claim 12, wherein character subsequences corresponding to the first hierarchical level are the unique words and two character sequences at the first hierarchical level are parsed by locating and designating words that occur only once in the second character sequence as unique words and locating words in the first character sequence that correspond to the unique words.

15. The computer program product of claim 11, wherein the instructions for performing the alignment of the two character sequences include instructions for constructing a Hidden Markov Model (HMM) at the current hierarchical level.

16. The computer program product of claim 11, wherein the instructions for performing the alignment of the two character sequences include instructions for utilizing a Viterbi algorithm to solve for the alignment at the current hierarchical level.

17. The computer program product of claim 11, wherein at each hierarchical level, the instructions for performing the alignment of the two character sequences result in at least one continuous multiple character subsequence in the first character sequence to be aligned with one character subsequence in the second character sequence, the continuous multiple character subsequences including an actual corresponding character subsequence and one or more extra character subsequences, and wherein the instructions for aligning the two character sequences further include, performing post-processing based on heuristic rules to separate the actual corresponding character subsequence from the one or more extra character subsequences.

18. A system for generating a character-by-character alignment between a first and a second character sequence representing text in a source, comprising:
a computer processor that is operable to execute a computer program product tangibly embodied in a computer-readable storage medium, the computer program product being operable to cause the computer processor to:
align the two character sequences in a hierarchical manner utilizing a plurality of hierarchical levels, wherein the first character sequence is an optical character recognition (OCR) text output of a document, and the second character sequence is a separate electronic version of the document, and wherein:
for a first hierarchical level, unique words of the second character sequence are aligned with corresponding words of the first character sequence and unique word anchors for a lower hierarchical level are designated;

for each hierarchical level below the first hierarchical level and above a final hierarchical level, the computer program product is operable to cause the computer processor to:

parse the two character sequences at a current hierarchical level into character subsequences, align the character subsequences, and designate the character subsequences at the current hierarchical level as anchors, the parsing of the character sequences and aligning of the character subsequences being performed between the anchors generated from an immediately previous hierarchical level if the current hierarchical level is below the first hierarchical level; and for the final hierarchical level, the computer program product is operable to cause the computer processor to:

perform character-by-character alignment between the first character sequence and the second character sequence by aligning each character in the first character sequence at the final hierarchical level to each respective character in the second character sequence at the final hierarchical level, each of the characters being between anchors generated from an immediately previous hierarchical level, and identify extra OCR text, the extra OCR text comprising text that is included in the first character sequence and that is not included in the second character sequence, and eliminate the extra OCR text from the OCR text output.

19. The system of claim 18 wherein the hierarchical levels include the first, a second, and the final hierarchical level, and the character subsequences corresponding to the second hierarchical level are words.

20. The system of claim 19, wherein in the second hierarchical level, the computer program product is operable to cause the computer processor to perform the alignment of the two character sequences between words in the two character sequences corresponding to the first hierarchical level, the words being only between the unique word anchors designated in the first hierarchical level.

21. The system of claim 19, wherein character subsequences corresponding to the first hierarchical level are the unique words and wherein the computer program product is operable to cause the computer processor to parse the two character sequences at the first hierarchical level by locating and designating words that occur only once in the second character sequence as unique words and by locating words in the first character sequence that correspond to the unique words.

22. The system of claim 18, wherein the computer program product operable to cause the computer processor to perform the alignment of the two character sequences is further operable to cause the computer processor to construct a Hidden Markov Model (HMM) at the current hierarchical level.

23. The system of claim 18, wherein the computer program product is operable to cause the computer processor to perform the alignment of the two character sequences utilizing a Viterbi algorithm to solve for the alignment at the current hierarchical level.

24. The system of claim 18, wherein at each hierarchical level, aligning the two character sequences results in at least one continuous multiple character subsequence in the first character sequence to be aligned with one character subsequence in the second character sequence, the continuous multiple character subsequences including an actual corresponding character subsequence and one or more extra character subsequences, and wherein the computer program product is further operable to cause the computer processor to perform post-processing based on heuristic rules to separate the actual corresponding character subsequence from the one or more extra character subsequences.

25. A method for generating a character-by-character alignment between a first and a second character sequence, comprising:

executing on a processor instructions for aligning the two character sequences in a hierarchical manner utilizing a plurality of hierarchical levels, wherein the first character sequence is an optical character recognition (OCR) text output of a document, and the second character sequence is a separate electronic version of the document, and wherein:

for a first hierarchical level, unique words of the second character sequence are aligned with corresponding words of the first character sequence and unique word anchors for a lower hierarchical level are designated;

for each hierarchical level below the first hierarchical level and above a final hierarchical level, aligning the two character sequences includes:

parsing the two character sequences at a current hierarchical level into character subsequences based on non-unique words between the two character sequences, aligning the character subsequences using the non-unique words, and designating the character subsequences at the current hierarchical level as non-unique word anchors, the parsing of the character sequences and aligning of the character subsequences being performed between the non-unique word anchors generated from an immediately previous hierarchical level if the current hierarchical level is below the first hierarchical level; and for the final hierarchical level, aligning the two character sequences includes:

performing one-to-one alignment of characters between the first character sequence and the second character sequence by aligning each character in the first character sequence at the final hierarchical level to each respective character in the second character sequence at the final hierarchical level, each of the characters being between non-unique word anchors generated from an immediately previous hierarchical level, identifying extra OCR text, the extra OCR text comprising text that is included in the first character sequence and that is not included in the second character sequence, and eliminating the extra OCR text.

26. A computer program product tangibly embodied in a non-transitory computer-readable storage medium for generating a character-by-character alignment between a first and a second character sequence, the computer program product being operable to cause a computer processor to:

align the two character sequences in a hierarchical manner utilizing a plurality of hierarchical levels, wherein the first character sequence is an optical character recognition (OCR) text output of a document, and the second character sequence is a separate electronic version of the document, and wherein:

for a first hierarchical level, unique words of the second character sequence are aligned with corresponding words of the first character sequence and unique word anchors for a lower hierarchical level are designated;

for each hierarchical level below the first hierarchical level and above a final hierarchical level, instructions for aligning the two character sequences include:
  parsing the two character sequences at a current hierarchical level into character subsequences based on non-unique words between the two character sequences,
  aligning the character subsequences using the non-unique words, and
  designating the character subsequences at the current hierarchical level as non-unique word anchors, the parsing of the character sequences and aligning of the character subsequences being performed between the non-unique word anchors generated from an immediately previous hierarchical level if the current hierarchical level is below the first hierarchical level; and for the final hierarchical level, the instructions for aligning include:
  performing one-to-one alignment of characters between the first character sequence and the second character sequence by aligning each character in the first character sequence at the final hierarchical level to each respective character in the second character sequence at the final hierarchical level, each of the characters being between non-unique word anchors generated from an immediately previous hierarchical level, and
  identifying extra OCR text, the extra OCR text comprising text that is included in the first character sequence and that is not included in the second character sequence, and
  eliminating the extra OCR text.

27. A system for generating a character-by-character alignment between a first and a second character sequence representing text in a source, comprising:
  a computer processor that is operable to execute a computer program product tangibly embodied in a computer-readable storage medium, the computer program product being operable to cause the computer processor to:
  align the two character sequences in a hierarchical manner utilizing a plurality of hierarchical levels, wherein the first character sequence is an optical character recognition (OCR) text output of a document, and the second character sequence is a separate electronic version of the document, and wherein:
    for a first hierarchical level, unique words of the second character sequence are aligned with corresponding words of the first character sequence and unique word anchors for a lower hierarchical level are designated;
    for each hierarchical level below the first hierarchical level and above a final hierarchical level, the computer program product is operable to cause the computer processor to:
    parse the two character sequences at a current hierarchical level into character subsequences based on non-unique words between the two character sequences,
    align the character subsequences using the non-unique words, and
    designate the character subsequences at the current hierarchical level as non-unique word anchors, the parsing of the character sequences and aligning of the character subsequences being performed between the non-unique word anchors generated from an immediately previous hierarchical level if the current hierarchical level is below the first hierarchical level; and
    for the final hierarchical level, the computer program product is operable to cause the computer processor to:
    perform one-to-one alignment of characters between the first character sequence and the second character sequence by aligning each character in the first character sequence at the final hierarchical level to each respective character in the second character sequence at the final hierarchical level, each of the characters being between non-unique word anchors generated from an immediately previous hierarchical level, and
    identify extra OCR text, the extra OCR text comprising text that is included in the first character sequence and that is not included in the second character sequence, and
    eliminate the extra OCR text.

* * * * *

UNITED STATES PATENT AND TRADEMARK OFFICE
CERTIFICATE OF CORRECTION

| | |
|---|---|
| PATENT NO. | : 8,170,289 B1 |
| APPLICATION NO. | : 11/232476 |
| DATED | : May 1, 2012 |
| INVENTOR(S) | : Shaolei Feng and R. Manmatha |

It is certified that error appears in the above-identified patent and that said Letters Patent is hereby corrected as shown below:

First Page, Column 2 (Other Publications), line 10, after "workshop" delete "on"

First Page, Column 2 (Other Publications), line 10, delete "languages ," and insert --languages,--

Signed and Sealed this
Eighteenth Day of September, 2012

David J. Kappos
*Director of the United States Patent and Trademark Office*